United States Patent [19]

Honegger et al.

[11] 3,744,040

[45] July 3, 1973

[54] MAGNETIC HEAD CONSTRUCTION

[75] Inventors: Arthur Honegger; Willy E. Schrepfer; Alan C. Kronfeld, all of Minneapolis, Minn.

[73] Assignee: Nortronics Company, Inc., Minneapolis, Minn.

[22] Filed: Feb. 16, 1972

[21] Appl. No.: 226,699

[52] U.S. Cl. 340/174.1 F, 179/100.2 C, 346/74 MC

[51] Int. Cl. .......................... G11b 5/26, G11b 5/28

[58] Field of Search ............................ 179/100.2 C; 340/174.1 F; 346/74 MC

[56] References Cited

UNITED STATES PATENTS

| | | | |
|---|---|---|---|
| 2,927,974 | 3/1960 | Stovall, Jr. ................... | 179/100.2 C |
| 3,414,971 | 12/1968 | Boehme ....................... | 179/100.2 C |
| 3,211,843 | 10/1965 | Dundovic et al ............ | 179/100.2 C |

*Primary Examiner*—J. Russell Goudeau
*Attorney*—Ralph F. Merchant et al.

[57] ABSTRACT

A read-after-write magnetic head with closely spaced, parallel read and write gaps is disclosed. A magnetic circuit comprising a pair of core pieces is provided for each gap. A coil is mounted on the outer core piece of each pair and each outer core piece is held in a core piece holder which extends over substantially all of the outer core piece except for a core piece tip in order to reduce flux leakage between circuits. Both of the inner core pieces for each gap are held in place by a center core piece holder of unitary construction. Two shields are located within the center core piece holder and are shaped to cooperate with the magnetic head housing to complete flux paths surrounding each of the read and write portions of the head.

1 Claim, 5 Drawing Figures

PATENTED JUL 3 1973

3,744,040

MAGNETIC HEAD CONSTRUCTION

BACKGROUND OF THE INVENTION

Field of the Invention

This invention relates generally to magnetic transducers and more particularly relates to a structure for a read-after-write magnetic head having improved means for reducing flux leakage between circuits and improving head performance.

Description of the Prior Art

Read-after-write magnetic heads are used in computer peripherals such as data acquisition, data storage, date retrieval and others to record statistical or other information on magnetic tape in one of the many binary data codes. These heads may have one or more channels, with each channel having closely spaced, parallel read and write gaps. Each gap is formed by a pair of core pieces forming a magnetic flux circuit with a coil mounted on one core piece of each circuit. The input to the write coil is a digital electrical signal comprising a series of pulses. As the magnetic tape passes over the head, the write gaps record information on the tape. Immediately after the recording step, the tape passes over the read gap where the recorded information is picked up and reproduced in order to check the accuracy of the recording. The read and write functions are carried on simultaneously by the heads so that the accuracy of the written data can be verified without stopping the writing process.

Because of the extremely close proximity of the read and write circuits, and because of the relatively high current flow through the write coil, the write signal tends to be fed over and picked up by the read circuit. This coupling is known as cross-feed. If this coupling between the read and write portions of the head, caused by leakage flux, is too high, the output of the read head may become meaningless. In other words, the signal induced in the read circuit by the leakage flux from the write circuit may be large enough to mask the signal being picked up from the tape. This problem has heretofore been dealt with by the use of a cross-feed shield located external to and in front of the head's face.

Another problem in the prior art is the accuracy of alignment of the read and write gaps. Since after the recording step, the tape passes over the read gap where the recorded information is picked up and reproduced, the two gaps must be aligned such that all of the information is picked up exclusive of cross-feed.

SUMMARY OF THE INVENTION

In accordance with the invention, a new and unique construction of a read-after-write magnetic head is provided for reducing flux leakage between read and write circuits and improving head performance. We are not aware of any other read-after-write head that has a sufficiently low cross-feed voltage without the use of an external shield in front of the head face. In a read-after-write magnetic head, a magnetic circuit comprising a pair of core pieces is provided for each closely spaced, parallel read and write gap. A coil is mounted on the outer core piece of each circuit. In order to reduce flux leakage between circuits, an outer core piece holder has a top portion which extends over substantially all of the outer core piece to expose only a tip which forms one side of the gap. Also, the inner core pieces are both held in a center core piece holder which is precision machined to provide more accurate transverse alignment between the read and write circuits than would exist if the center cores were housed independently and would have to be aligned optically. Within the center core piece holder a pair of shields are provided for completing flux paths surrounding each read and write portion of the magnetic head.

DESCRIPTION OF THE PREFERRED EMBODIMENT

Figures 1, 4, 5:
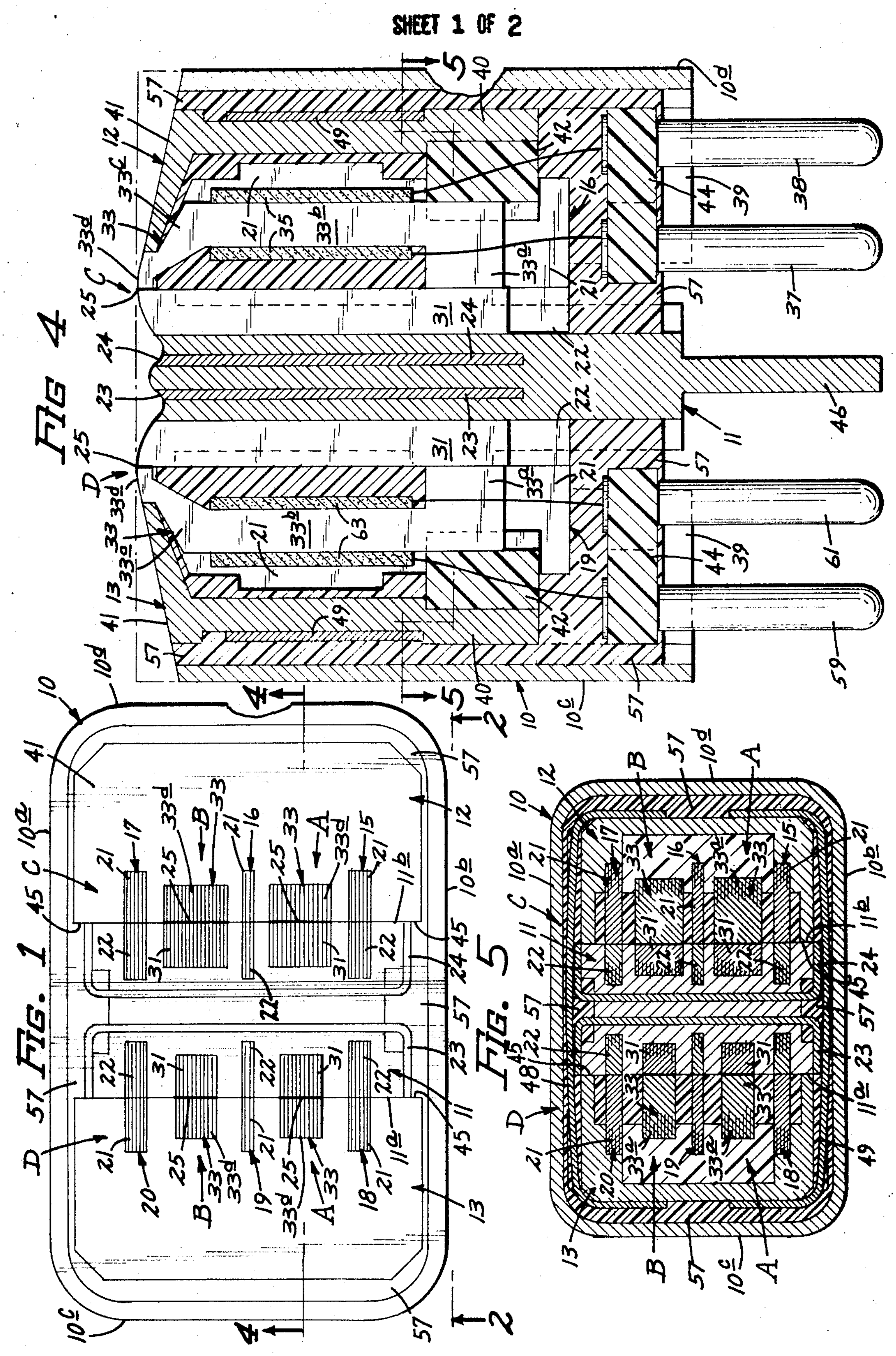
FIG. 1 is an enlarged plan view of the tape-engaging face of a miniature two-channel read-after-write magnetic head constructed according to the present invention.
FIG. 4 is a sectional view taken along line 4—4 of FIG. 1.
FIG. 5 is a sectional view taken along line 5—5 of FIG. 4.
Figures 2, 3:
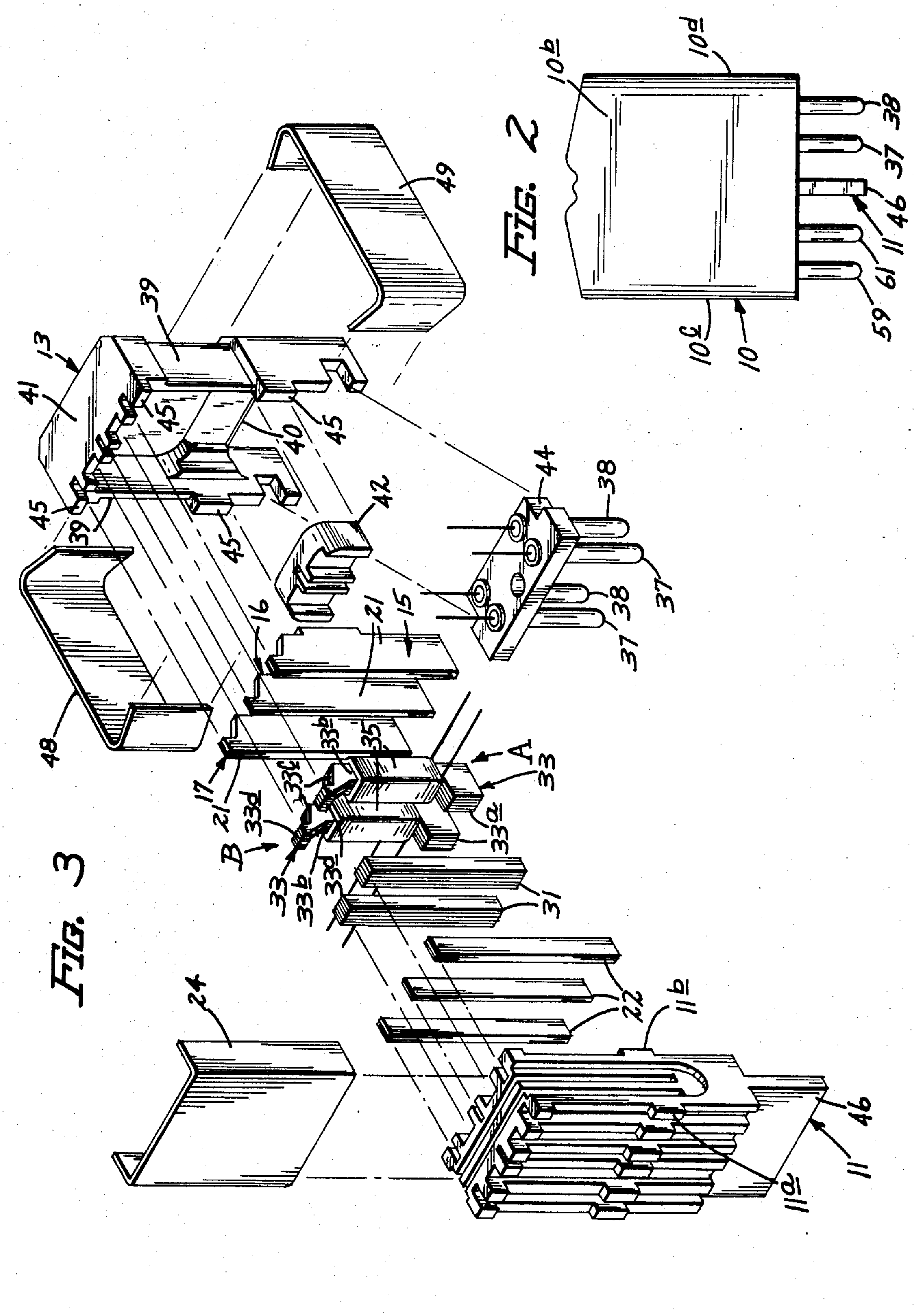
FIG. 2 is an elevational view of the head taken on line 2—2 of FIG. 1, on a reduced scale.
FIG. 3 is an exploded perspective view of the components of the write portion of the miniature two-channel read-after-write magnetic head.

In the drawings, like numerals will be used throughout the several views to indicate like elements of the invention. Referring first to FIGS. 1 and 2, a magnetic transducer having a box-like magnetic shield casing or housing 10 is shown having a rectangular cross-sectional configuration with parallel side walls **10*a* and 10*b*, and parallel end walls 10*c* and 10*d*. The top and bottom ends of the casing 10 are open with the top end exposing the head face. Mounted in casing 10 are a center core holder 11 and a pair of outer core holders 12 and 13 all of which will be discussed in more detail. Core holders 11, 12 and 13 are constructed from an electrically conductive, non-magnetic metal such as aluminum. The two channels for this transducer are designated in FIG. 1 by the letters A and B. The details of channels A and B are shown in FIG. 3. The read side of the head is designated C and the write portion is designated D. A plurality of narrow shields 15–20 are mounted in core holder slots around the channels A and B. As an example, shield 15 includes one portion 21 in core holder 12 and one portion 22 in core holder 11. Located in center core holder 11 are a pair of C-shaped shields 23 and 24. The shields 15–20 are constructed from a highly permeable material, such as the various metals sold under the trademarks "MU-METAL," "HY MU 800" and others, and are designed to reduce cross talk between channels, and shields 23 and 24 are designed to reduce cross-feed between the read and write sides of the head. Located between the channel portions in holders 12 or 13 and the channel portion in holder 11 are gaps 25. The gap spacer material for the gap 25 may be a strip of foil or may be a deposited material. In the operation of the head, the tape makes contact with the head face at gaps 25**.

Referring now to FIG. 3 and additionally to FIGS. 4 and 5 there is shown in greater detail primarily the components of the read side of the magnetic head. Center core holder 11 is constructed of a single unitary piece, and is generally flat and has oppositely facing sides **11*a* and 11*b* each having a plurality of spaced, vertically extending slots therein. Various core pieces and shields are mounted in these slots, as will be described, to form sides 11***a* and 11*b* into planar, parallel, arrangement. The outer core holder 12 has a plurality of vertically extending slots formed therein opposite corresponding slots in face. Various core pieces and shields are mounted in the slots in core holder 12 to form a planar face for positioning against the planar faces 11*a* and 11*b* of center core holder 11.

Shown in FIG. 3 are two laminated, straight core pieces 31 for mounting in the slots in face 11*b*, and a pair of generally U-shaped, laminated core pieces 33 for mounting in a corresponding slot in core piece holder 12. U-shaped core pieces 33 have a base leg portion 33*a*, a side leg portion 33*b* and a top leg portion 33*c*, which top leg portion includes a core tip 33*d*. Core pieces 31 and 33 are held in a generally coplanar relationship by the core holders 11 and 12, with core pieces 31 having a top portion thereof positioned adjacent core tip 33 and spaced therefrom by gap 25 forming a write gap. When constructed, the bottom portion of core piece 31 abuts the end of base leg portion 33*a* to complete the magnetic circuit. A coil 35 is mounted on side leg portion 33*b*. The ends of coil 35 lead to a pair of connector pins 37 and 38.

The outside core holders 12 and 13 each have two side walls 39, a back wall 40 and a top wall 41 extending from the back wall 40 forward to the front face of the core holder 12. Insertable within the core holder 12 or 13 is insert member 42. Insert member 42 has vertically extending slots located therein for cooperation with the slots located in top wall 41 of core holder 12 for holding the core pieces 33 and one shield 21. Insertable within lateral grooves 43 in core holder 12 is a terminal board assembly 44 which holds the connector pins 37 and 38 for each core piece.

Shields 15, 16 and 17 include first portions 22 which are insertable in slots within the center core holder 11, and second portions 21 which are insertable at their top within slots located in the top wall portion 41 of core holder 12 and at their bottom in the slot located within insert 42 and between insert 42 and side wall 39. When core holders 33 are inserted within core holder 12 the top wall 41 of the core holder 12 extends over top leg portion 33*c* and leaves exposed the core tip 33*d*.

With the shields 22 and the core pieces 31 inserted within center core holder 11 the sides 11*a* and 11*b* are then planar and parallel with respect to each other. And, with the core pieces 33 and the shields 21 inserted within the core holder 12 the base leg portions 33*a* and the core tips 33*d* of the top leg portion 33*c* form a planar surface with the furthermost extending portions 45 on holder 12, which planar surface is alignable with the planar side 11*b* on center core holder 11 for the eventual construction of the head. It will be appreciated that by inserting both the read and write core pieces 31 within a single core holder, such as center core holder 11, the center core holder 11 can be precision machined to insure that there is proper alignment of the read portion of the head with the write portion. Without this type of core holder, at least one additional surface would have to be aligned upon construction as is the case with the planar side 11b and the planar surface formed by the insertion of core pieces 33 and shields 21 within core holder 12. As seen in FIGS. 1, 3 and 4, center core holder 11 has a bottom portion 46 that extends beyond the bottom edge of casing 10 to form a grounding lug for the head and for high pulse rate shielding of cables. The connector pins 37 and 39 are mounted on the terminal board assembly 45 which extends between the side walls 10*a* and 10*b* as shown in FIG. 4.

To assemble the head, the core pieces and shields are adhesively secured in their respective slots in the core holders 11, 12 and 13 and then the planar sides 11*a*, 11*b* and the planar surface formed by core pieces 33 , shields 21 and portions 45 on core holders 12 and 13 are lapped and polished so that they are perfectly planar. The three core holders are then placed together in the relationship shown in FIG. 1 and securely clamped with electrically insulated clamps 48 and 49. The clamped head is then inserted within the casing 10. The use of clamps is more fully described in U.S. S. Pat. No. 3,484,562. At this point in construction, the top face of the head is generally flat, but it is later ground down to a desired tape-engaging face configuration, one example of which is shown in FIGS. 2 and 4.

To operate the head, suitable electric pulses are supplied to pins 59 and 61 in the read portion of the head to energize the coil 63. The energization of coil 63 causes magnetic flux to flow in the circuit comprising the core pieces 31 and 33, thus producing a suitable recording flux at the gap 25. The intense flux field at the gap 25 causes information to be recorded on the magnetic tape which then immediately passes over the read gap 25. The magnetized portions of the tape passing the gap 25 causes a flow of flux through the write circuits comprising core pieces 31 and 33 to in turn induce a current flow in coil 35.

If the signal produced by the write portion of the head is to be meaningful, it must not be interfered with by extraneous signals emanating from the other circuits in the head and it must be properly aligned with the read portion of the head to exactly duplicate the tapes information. By providing a top wall portion 41 on core holders 12 and 13 for covering substantially all of the top leg portion 33*c*, except for the core tip 33*d*, the opportunity for extraneous signals to be emanated or received is significantly reduced. The use of a single core holder to hold both inside core pieces 31 reduces the number of housing parts which must be assembled and thus provides better alignment of the read and write portions of each channel. Also, the C-shaped shields 23 and 24 located within core holder 11 cooperate with the housing 10 to form a complete flux path surrounding each of the read and write portions of the head. The spaces between the elements are then filled with a liquid epoxy material 57 which hardens to fixedly retain the elements in the position shown. The combination of C-shaped shields 23 and 24 located within the single piece core holder 11 with the top wall portion 41 on core holders 12 and 13 and the shields 15–20 significantly reduces the flux leakage which is so detrimental to accurate computing and calculating.

What is claimed is:

1. A magnetic head having closely spaced, parallel write and read gaps, comprising:

a. first and second generally U-shaped separate and unconnected core pieces mounted in first and second core holders;

b. a center core holder constructed from a single piece of non-magnetic metal and having oppositely facing, parallel sides;

c. first and second separate and unconnected center core pieces mounted in said center core holder sides, each center core piece abutting a corresponding U-shaped core piece to provide a read or write gap therebetween and to complete magnetic read and write circuits;

d. read and write coils mounted on said U-shaped core pieces;

e. means including a magnetic shield outer casing for holding said center core holder between and in contact with said first and second core holders;

f. permeable center shield means mounted in slot means within said center core holder, said shield means being between and planar with said center core holder sides for reducing leakage flux between said read and write circuits; and g. said permeable center shield means including a first generally U-shaped shield mounted in a first slot in said slot means for cooperation with said outer casing in completing a flux circuit around said read circuit and a second oppositely facing generally U-shaped shield mounted in a second slot in said slot means for cooperation with said outer casing in completing a flux circuit around said write circuit, said first and second shields having side portions thereof extending from each of said first and second slots in said slot means along said outer casing toward said center core holder sides.

* * * * *